(12) United States Patent
Abatzoglou

(10) Patent No.: US 12,332,378 B1
(45) Date of Patent: Jun. 17, 2025

(54) SYSTEMS AND METHODS FOR PROCESSING SPARSE ARRAY RADAR SIGNALS WITH ANGLE-DEPENDENT CALIBRATION

(71) Applicant: Deere & Company, Moline, IL (US)

(72) Inventor: Theagenis J. Abatzoglou, Dana Point, CA (US)

(73) Assignee: Deere & Company, Moline, IL (US)

( * ) Notice: Subject to any disclaimer, the term of this patent is extended or adjusted under 35 U.S.C. 154(b) by 329 days.

(21) Appl. No.: 18/182,880

(22) Filed: Mar. 13, 2023

(51) Int. Cl.
*G01S 7/40* (2006.01)
*G01S 13/00* (2006.01)

(52) U.S. Cl.
CPC ............. *G01S 7/4026* (2013.01); *G01S 7/40* (2013.01); *G01S 7/403* (2021.05); *G01S 7/4034* (2021.05); *G01S 13/003* (2013.01)

(58) Field of Classification Search
CPC ...... G01S 7/4026; G01S 7/4034; G01S 7/403; G01S 7/40; G01S 13/003
USPC .......................................................... 342/174
See application file for complete search history.

(56) References Cited

U.S. PATENT DOCUMENTS

| 2019/0265330 A1* | 8/2019 | Rajendran | ............ G01S 13/867 |
| 2020/0033445 A1* | 1/2020 | Raphaeli | .................. H01Q 1/38 |
| 2021/0025972 A1* | 1/2021 | Loesch | ................. G01S 7/4034 |
| 2021/0215793 A1* | 7/2021 | Ali | ......................... G01S 13/584 |
| 2022/0381879 A1* | 12/2022 | Tsai | ....................... G01S 13/42 |

FOREIGN PATENT DOCUMENTS

CN         104111448 A    * 10/2014    ........... G01S 7/4008

* cited by examiner

*Primary Examiner* — William Kelleher
*Assistant Examiner* — Samarina Makhdoom
(74) *Attorney, Agent, or Firm* — Gary L. Montle; Lucian Wayne Beavers; Patterson Intellectual Property Law, PC

(57) ABSTRACT

The present disclosure generally relates to methods, systems, apparatuses, and non-transitory computer readable media for calibrating a sparse radar system, particularly to configure the radar system to account for non-uniform, angle-dependent antenna responses. More precisely, systems of the present disclosure may utilize one or more calibration reflectors located at a series of known relative angle values to obtain calibration radar return information from a radar system. Utilizing the known relative angles of the calibration reflectors, the calibration radar return information may be processed to estimate, for each antenna at each of the series of angle values, the degree the antenna's response to signals arriving at the antenna varies from the other antennas' responses to those signals. These estimates may then be used to determine, for each of the series of angle values for each of the antennas, a respective calibration factor. The calibration factors may be used in a data-adaptive spectral estimation procedure to adjust radar return data from the radar system to correct for each antenna's non-uniform responses and estimate the angles of arrival of the impinging signals on the MIMO array.

15 Claims, 11 Drawing Sheets

SYSTEMS AND METHODS FOR PROCESSING SPARSE ARRAY RADAR SIGNALS WITH ANGLE-DEPENDENT CALIBRATION

TECHNICAL FIELD

The present disclosure generally relates to radar signal processing, and more particularly, methods, systems, apparatuses, and non-transitory computer readable media for processing radar signals of a MIMO radar system.

BACKGROUND

Radar is increasingly a key component of the sensor suites of many modern-day technologies. For many of these technologies, radar systems are used to image an environment or detect the position of objects within an environment. This is usually for a local environment—such as within several hundred meters—as opposed to the prior use of utilizing radar for more long-range tracking. Local object detection can be used for a variety of purposes but may in particular be used to aid a system, such as a robot or self-driving car, in navigating through an environment. Radar has several advantages over other object detection systems in that it is unimpeded by inclement weather. Another advantage of radar systems is that, in addition to their use for radar imaging, they may also be used to directly measure the velocity of detected objects.

Because of the increased spatial resolution they provide, multiple-input multiple-output (MIMO) radar systems are oftentimes used to implement radar imaging. A key part of MIMO radar systems is how the signals generated by a MIMO radar system are processed to detect and locate objects in the environment being sensed. Because of the nature of MIMO radar signals and the complexity of distinguishing the effects that different objects in the environment have on those signals, these processes usually involve complex, computationally heavy statistical analysis on the observed MIMO radar signals. In turn, this computational burden has led to most MIMO radar-systems employing signal processing techniques based on simplifying assumptions about the radar system and the signals it generates, in order to minimize the often inherently-high computational load of MIMO radar signal processing.

Naturally, the tradeoff for this reduced computation load is that any object detection and location obtained has a greater degree of inaccuracy relative to a more comprehensive signal processing technique. One such simplifying assumption that has become increasingly relevant is the assumption that each transceiver of a MIMO radar system is identical and independent from the operation of any other transceiver of the radar system. In practice, MIMO radar systems' transceivers often have some degree of variance in their operation and have some degree of cross-coupling in their operation. The failure to account for these effects results in the location determined for a detected object in the environment deviating from the true location. As the size and sensitivity of modern MIMO radar systems have increased, these deviations have become a substantial component of the error in the location parameters of detected objects.

Accordingly, systems that can effectively account for the variance in a MIMO radar system's transceivers are greatly desired.

BRIEF DESCRIPTION OF THE DRAWINGS

Embodiments and various aspects of the present disclosure are illustrated in the following detailed description and the accompanying figures. Various features shown in the figures are not drawn to scale.

DETAILED DESCRIPTION

Figure 1:
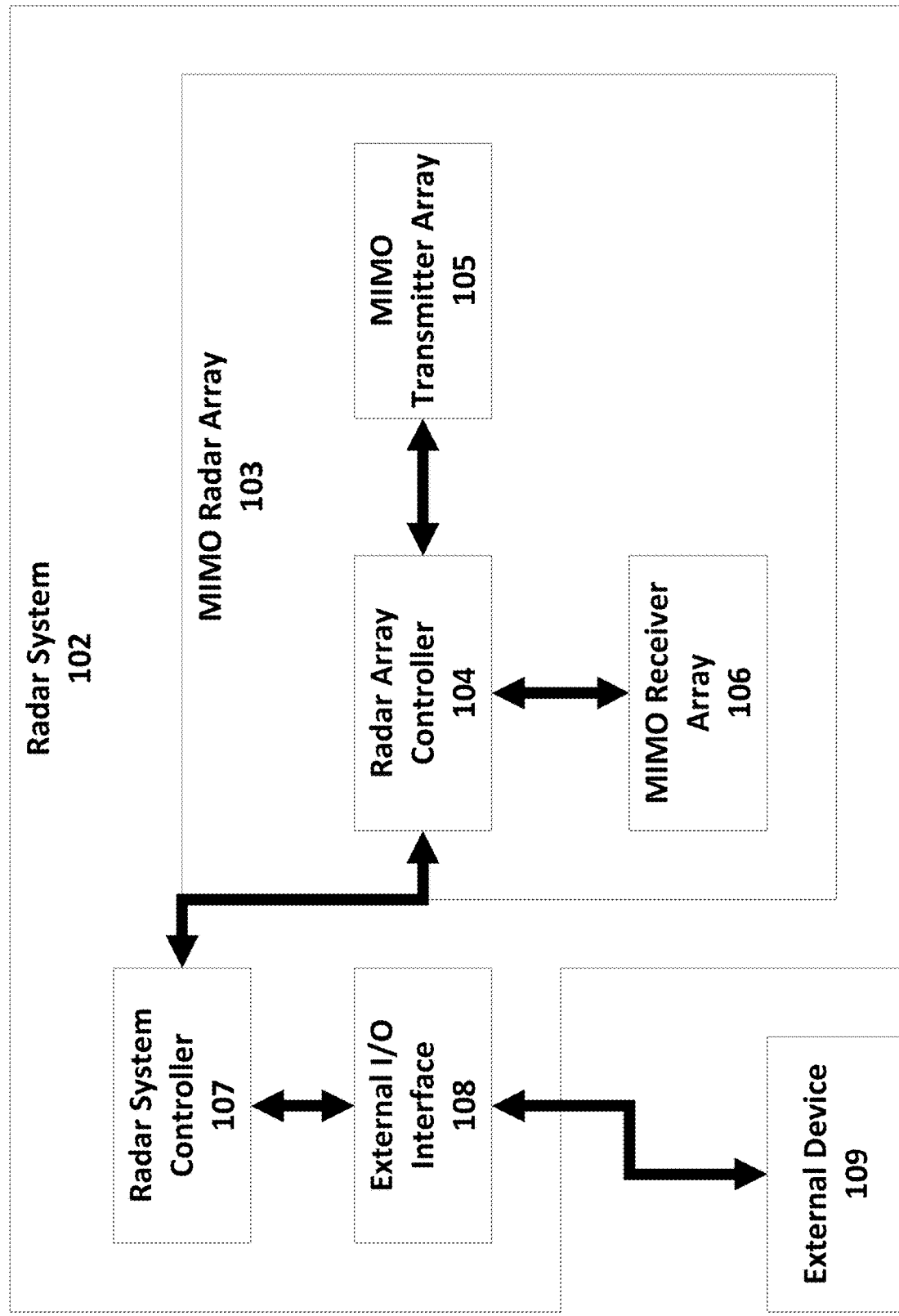
FIG. 1 is a block diagram of a multiple-input multiple-output (MIMO) radar system in accordance with an exemplary embodiment of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

The present disclosure generally pertains to systems and methods for calibrating a radar system, particularly so as to configure the radar system to the particulars of the radar system's receiver antennas. These radar calibration systems may be of use across a wide range of applications utilizing radar systems for environmental imaging. By enabling a radar system to account for idiosyncrasies in its receiver antennas, systems of the present disclosure can make radar systems more accurate in an efficient and cost-effective manner. By the same process, embodiments of the present disclosure also make the positioning information derived from a radar system more accurate and with greater fidelity, enhancing their use as sensors in other devices, particularly for environmental navigation.

More precisely, systems of the present disclosure may employ a radar system and one or more radar-reflective markers. The radar system may generate a series of radar signals to obtain a series of radar returns spread across a desired interval of angles relative to the radar system. These returns may then be treated as if they are the product of idealized radar returns—the generated radar signal as modified by their propagation and reflection from the radar-reflective marker and the relative positioning of the radar system's antennas—and an antenna-dependent, angle-dependent calibration factor containing entries for each of the radar system's receivers at various points along the desired interval of angles. Because the generated radar signal, the positioning of the various transmitters and receivers of the radar system and the positioning of the one or more radar-reflective markers are all known, the idealized radar returns may be directly determined, leaving the calibration factor as the only remaining uncertainty in the obtained radar returns, which in turn may allow the calibration factor to be calculated from the received radar returns. Once calculated, this calibration factor may be used to adjust future received radar returns to account for antenna-specific, angle-dependent noise.

To better explain, note that radar systems operate, at a fundamental level, by transmitting a radar signal using a transmitter antenna and then attempting to receive echoes of the transmitted radar signal—caused by the transmitted radar signal encountering and reflecting off various objects in the environment—using a receiver antenna. Typically, in the case of a single-transmitter, single receiver radar system, the information that may be determined is the radial range of radar signal-reflecting objects along with, for some radar systems, the radial velocity of these objects. For systems employing multiple transmitters and multiple receivers—such as multiple-input multiple-output (MIMO) radar systems—more information can usually be obtained. Typically, this additional information is the relative angle (e.g., the angle along the horizontal axis called azimuth and the angle along the vertical axis called elevation) of the object to the plane of the transmitters and receivers.

In both cases, the received radar signal returns are assumed to be a combination of echoes from various reflecting objects, where each objects' contribution may be modeled in the form of the transmitted radar signal(s) primarily being modified only by (1) their propagation to the reflecting object from the transmitting antenna(s), (2) their reflection from the reflecting object, and (3) their propagation from their reflecting objects back to the receiving antennas. For MIMO radar systems being used to measure the azimuth and/or elevation of reflecting objects (e.g., being used to perform radar imaging), this means that it is generally assumed that the signals transmitted by each one of the transmitter antennas does not vary depending on the angle to the transmitter antenna (within a certain interval) and does not vary depending on the identity of the originating transmitter. Similarly, for these same radar systems it is generally assumed that the radar signals measured by each one of the receiver antennas does not vary depending on the angle to the receiver antenna (within a certain interval) and does not vary depending on the identity of the measuring receiver.

The reason for these two additional assumptions for MIMO radar systems is that the way MIMO radar systems typically determine the relative angle of a reflecting object is by estimating the parameters (e.g., amplitude, frequency, and phase) of the radar signal echo reflected by the object (using the object's contribution to the received radar signal returns) and evaluating the change in phase of the radar signal echo between successive antennas. Put another way, if the transmitter antennas transmit with no transmitter-dependent and angle-dependent error and the receiver antennas receive with no receiver-dependent and angle-dependent error, the change in phase of a reflected radar signal depends (to a high degree of accuracy) only on the distance between the transmitter and receiver antennas and the angle at which the reflected radar signal impinges upon the plane of the transmitter and receiver antennas.

For many reasons, such as the already large computation burdens of even the least resource-intensive technique for processing the radar return signals from MIMO radar systems, existing systems assume the non-existence of antenna-specific and angle-specific error in MTMO radar systems. While these assumptions may have been within an acceptable margin of error for previous applications, the increasing accuracy of MIMO radar systems and the decreasingly accepted margin of error for systems relying on data obtained from MIMO radar systems has led to the deviations from these assumptions becoming a key problem.

For radar imaging systems, particularly radar imaging systems based on MIMO radar, the radar imaging system typically determines the angle of the radar return signal utilizing the change in phase of the radar return signal between the antennas of the radar array. The angle that the incoming radar return signal impinges on the radar array is relevant because this value corresponds to the angle of the scatterer generating the radar return signal relative to the radar array. While the correspondence depends on the layout of the MIMO radar array, for the common case where transmitter antennas are linearly arranged along a vertical axis and receiving antennas are linearly arranged along a horizontal axis, the change in phase of a received radar return signal between receiver antennas corresponds to the azimuth of the generating scatterer relative to the radar array. Similarly, the change in phase of a received radar return signal between transmitter antennas corresponds to the elevation of the generating scatterer relative to the radar array.

Deviations in the determined phase of a radar return signal specific to only one of the MIMO radar array's antennas may lead to errors in the calculated relative phase difference and may thus introduce error into the determined position of detected scatterers.

To better address these issues, embodiments of the present disclosure may utilize one or more calibration reflectors to obtain calibration radar return information from a radar system. These calibration reflectors are located at known relative angles to the antenna array of the radar system and are distributed so as to encompass a series of angle values within a range of angles (e.g., between −45° to 45° azimuth). Utilizing the known relative angles of the calibration reflectors, the calibration radar return information may be processed to estimate, for each antenna at each of the series of angle values, the degree the antenna's response to signals arriving at the antenna varies from the other antennas' responses to those signals. These estimates may then be used to determine, for each of the series of angle values for each of the antennas, a respective calibration factor. The calibration factors may be used in a data-adaptive spectral estimation procedure to adjust radar return data from the radar system to correct for each antenna's non-uniform responses.

FIG. 1 shows a block diagram of a radar system, in accordance with an exemplary embodiment of the present disclosure. As shown by the figure, a radar system 102 may comprise a multiple-input multiple-output (MIMO) radar array 103, at least one radar system controller 107, and an external input/output (I/O) interface 108. In turn, the MIMO radar array 103 may comprise a radar array controller 104, a transmitter array 105, and a receiver array 106. The radar system controller 107 is connected to and interacts with the MIMO radar array 103 and the external I/O interface 108, through which the radar system controller 108 may interact with external devices, shown here as external device 109. Similarly, the radar array controller 104 is connected to and interacts with the transmitter array 105 and the receiver array 106. Broadly speaking, the radar system controller 107 may work to control the MIMO radar array 103 and to process the radar return data (e.g., the radar return samples) obtained by the MIMO radar array 103, such as to implement the method described in FIG. 12 below. The MIMO radar array 103 may work to transmit radar signals and receive their reflections—as directed by the radar system controller 107—by interacting and controlling the transmitter array 105 and the receiver array 106.

In operation, the radar system controller 107 interacts with the MIMO radar array 103 to transmit and then receive a plurality of radar signals. The MIMO array controller 104—as directed by the radar system controller 107—then interacts with the transmitter array 105 to transmit a radar signal pulse (from each of the transmitter array's transmitter elements) and interacts with the receiver array 106 to obtain (from each of the receiver array's receiver elements) multiple sequential measurements of the radio waves being received. The radar array controller 104 may receive the measurements from the receiver array 106, where it may perform various initial low-level processing. This process is usually repeated for several iterations, such that multiple radar signal pulses are transmitted, each of which is associated with multiple samples measuring the radio wave being received by the receiver array 106. Such a series of related radar signal pulses is known as a radar signal pulse train and the period of time that the MIMO radar array 103 is transmitting or sampling echoes of a radar signal pulse train is known as a dwell. Eventually, the radar array controller 104 may send this data to the radar system controller 107, which may process the data for various higher-level signal processing (e.g., radar imaging and object detection), such as the method described in FIG. 7 below. The result of this processing may then be transmitted through the external I/O interface 108 to an external device, such as external device 109, which may use the transmitted data for various purposes.

The external I/O interface 108 may comprise circuitry configured to communicate with other devices. As an example, the external I/O interface 108 may comprise modems, wireless radios (e.g., cellular transceivers), or other devices that are designed to communicate using peer-to-peer short-range wireless communication protocols, such as Bluetooth, Wi-Fi, near-field communication (NFC), Ultra-wideband (UWB), IEEE 1902.15.4, or radio frequency identification (RFID). The external I/O interface 108 may also comprise modems, wireless radios (e.g., cellular transceivers), or other devices that are designed to communicate with network access points, such as cellular towers, network routers, Wi-Fi hots spots, or other types of access points.

The radar system controller 107 may be implemented in hardware or a combination of hardware and software. As an example, the radar system controller 107 may comprise one or more field programmable gate arrays (FPGAs) or one or more application-specific integrated circuits (ASICs). In some embodiments, the radar system controller 107 may comprise one or more processors (e.g., central processing units (CPUs) or microprocessors) programmed with software that when executed by the processor cause it to perform the functions described herein for the radar system controller 107. In other embodiments, other configurations of the radar system controller 107 are possible.

Similarly, the radar array controller 104 may be implemented in hardware or a combination of hardware and software. As an example, the radar array controller 104 may comprise one or more field programmable gate arrays (FPGAs) or one or more application-specific integrated circuits (ASICs). In some embodiments, the radar array controller 104 may comprise one or more processors (e.g., central processing units (CPUs) or microprocessors) programmed with software that when executed by the processor cause it to perform the functions described herein for the radar array controller 104. In other embodiments, other configurations of the radar array controller 104.

Note that, while shown separately in FIG. 1, the radar system controller 107 and the radar array controller 104 may be combined into one component or otherwise share hardware resources, such as memory or processors. When separated, like in FIG. 1, the radar array controller 104 typically controls low-level functioning and management of the transmitter array 105 and the receiver array 106, along with other possible components of the MIMO radar array 103, such as a power source. In contrast, the radar system controller 107 typically handles higher-level functioning of the radar system 102 and typically handles processing radar return samples to perform various radar imaging functions. Also note that in some embodiments, unlike what is shown in FIG. 1, the radar system controller 107 may not connect to an external device.

Figure 2:
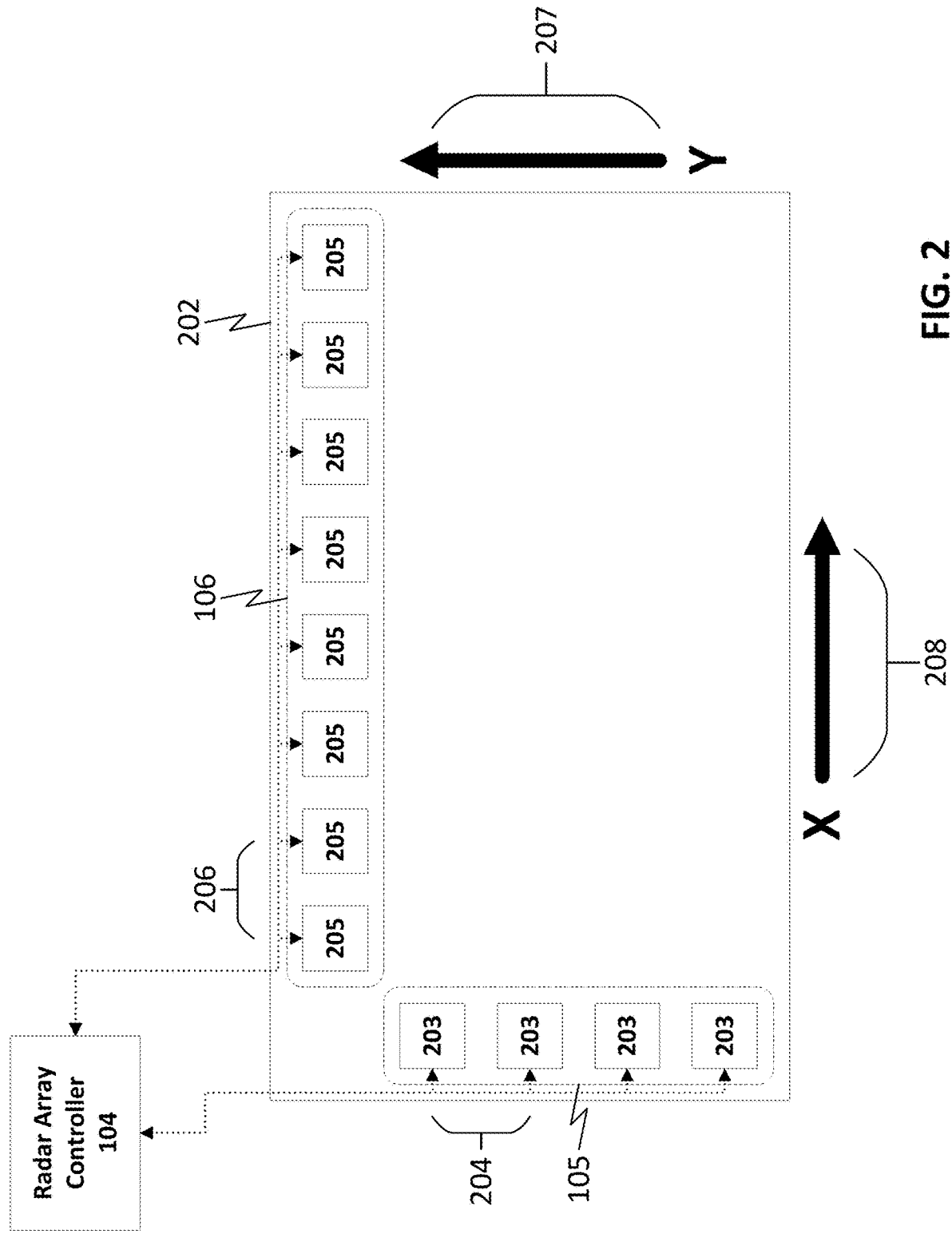
FIG. 2 is a block diagram of a MIMO radar array, such as the MIMO radar array of FIG. 1.

FIG. 2 shows a more detailed diagram of the MIMO radar array shown in FIG. 1. As shown by the figure, the MIMO radar array 103 comprises the radar array controller 104, the transmitter array 105, and the receiver array 106. The transmitter array 105 comprises a plurality of transmitter elements 203. Similarly, the receiver array 106 comprises a plurality of receiver elements 205. The transmitter elements 203 and the receiver elements 205 are arranged together to form a MIMO antenna array 202, with the transmitter elements 304 arranged along a first axis (shown here as y-axis 207) and the receiver elements 205 arranged along an orthogonal second axis (shown here as x-axis 208). Like with all planar MIMO antenna arrays, the transmitter elements 203 of MIMO antenna array 202 are distributed along an axis (e.g., y-axis 207). Similarly, the receiver elements 205 of MIMO antenna array 202 are distributed along another axis (e.g., x-axis 208) orthogonal to the first axis.

Note that, in general, one or both of the transmitter elements 203 or the receiver elements 205 may be sparsely spaced. Broadly speaking, "sparsely spaced" means that, as measured from a starting position and for a characteristic wavelength, there is not (guaranteed to be) a transmitter or receiver element at every multiple of one-half the characteristic wavelength from the starting position.

Figure 3:
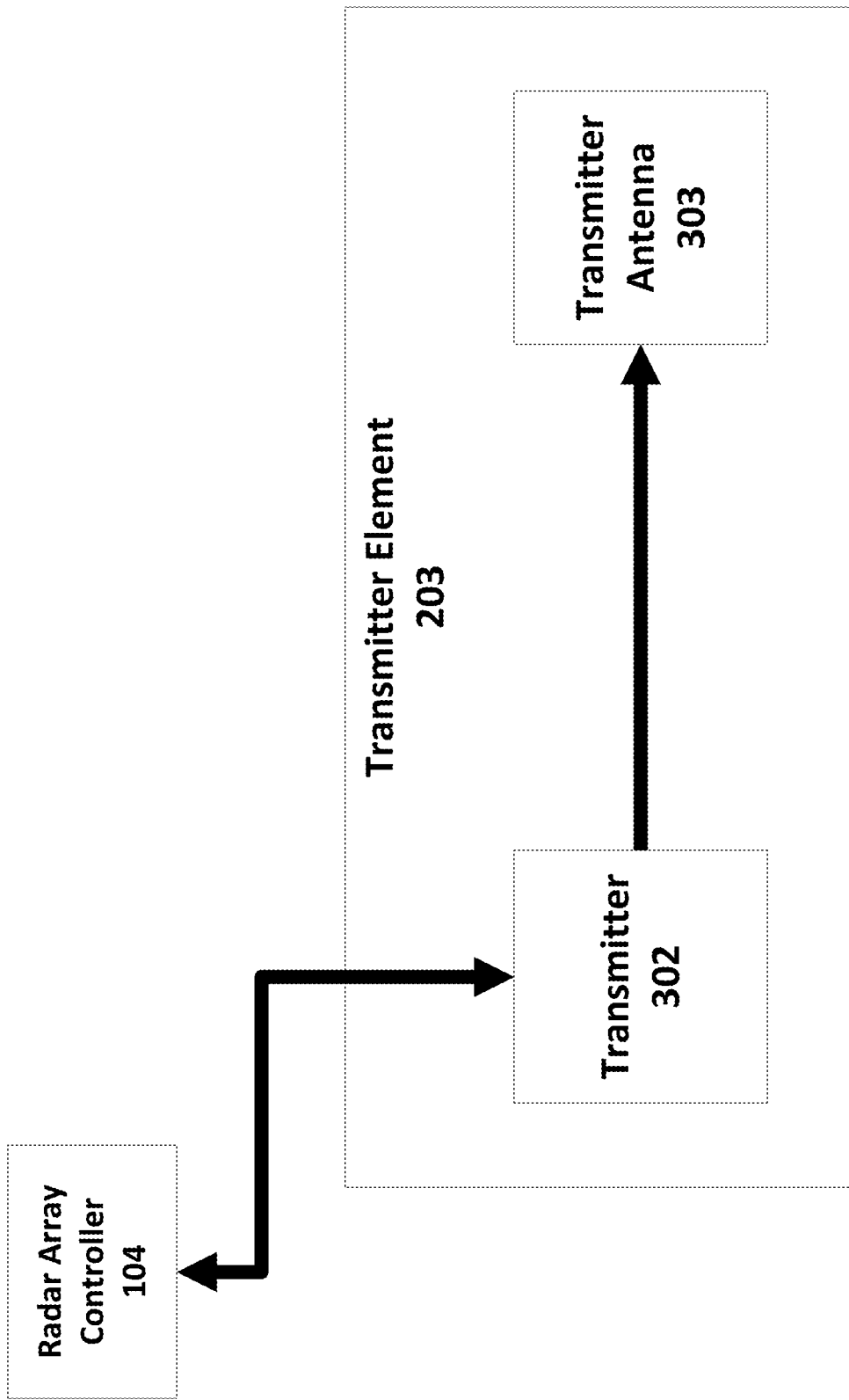
FIG. 3 is a block diagram of a transmitter element of a MIMO radar array, such as the MIMO radar array of FIG. 2.

FIG. 3 shows a diagram of the transmitter element shown in FIG. 2. As shown by the figure, a transmitter element 203 may comprise a computer-controlled transmitter 302 and a transmitter antenna 303. The transmitter 302 is connected to the transmitter antenna 303 and the radar array controller 104. In operation, the radar array controller 104 sends a command to the transmitter element 203 to transmit a radio signal with a specified frequency, amplitude, and phase. The transmitter 302 receives this command and, in response, generates an electrical signal with a frequency, amplitude, and phase corresponding to frequency, amplitude, and phase specified in the received command. The transmitter antenna 303 then receives the electrical signal from the transmitter 302 and emits a corresponding radio wave signal whose frequency, amplitude, and phase are as specified in the command from the radar array controller 104.

Figure 4:
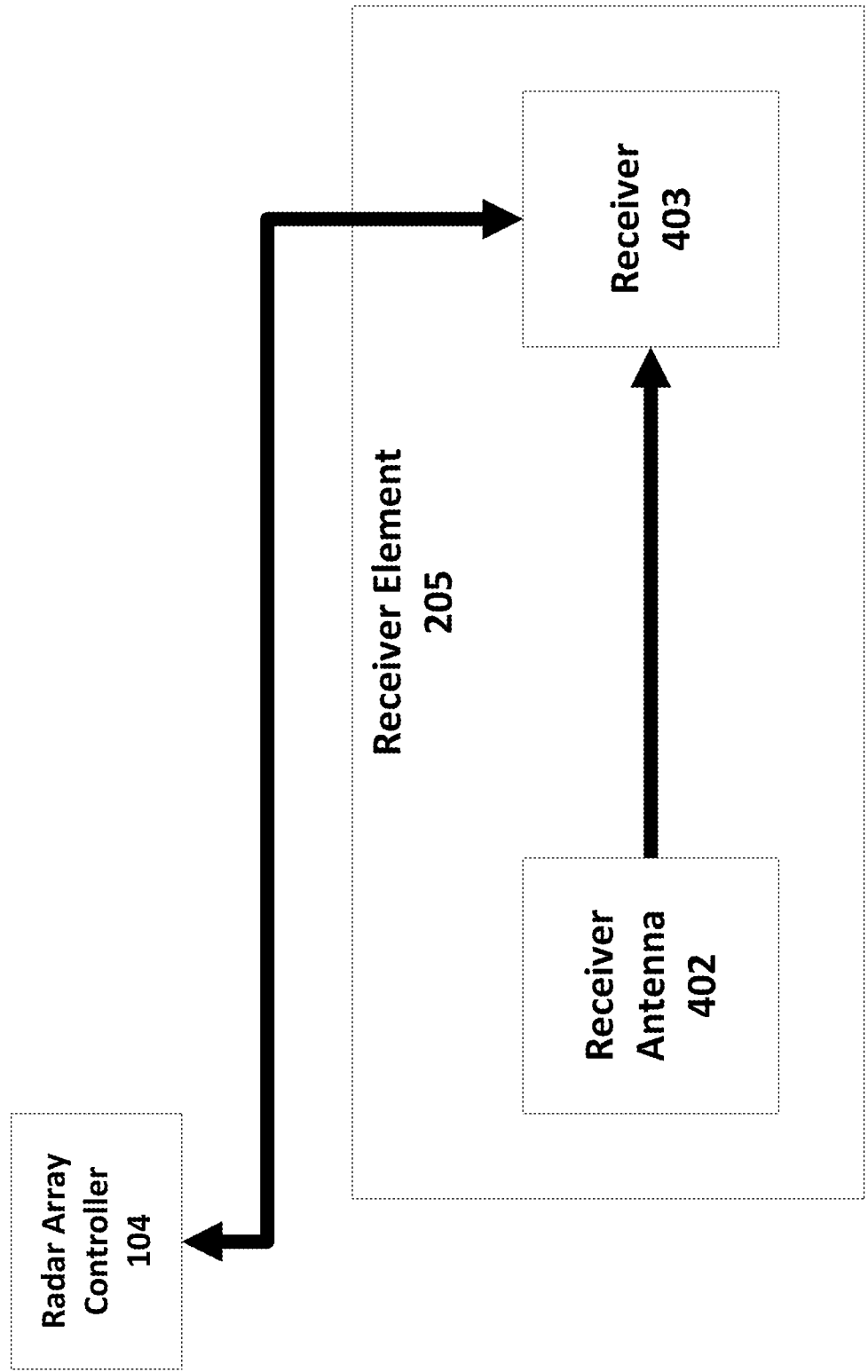
FIG. 4 is a block diagram of a receiver element of a MIMO radar array, such as the MIMO radar array of FIG. 2.

FIG. 4 shows a diagram of the receiver element shown in FIG. 2. As shown by the figure, a receiver element 205 may comprise a receiver antenna 402 and a computer-controlled receiver 403. The receiver 403 is connected to the receiver antenna 402 and the radar array controller 104. In operation, the radar array controller 104 sends a command to the receiver element 205 to measure the frequency and amplitude of the radio waves being received after first modifying the phase of the received radio waves by a certain phase shift. The receiver 403 receives this command and, in response, receives an electrical signal being generated by the receiver antenna 402. This electrical signal is generated by the receiver antenna 402 in response to receiving a radio wave signal that has a certain frequency, amplitude, and phase, with the generated electrical signal's frequency, amplitude, and phase corresponding to the frequency, amplitude, and phase of the received radio wave signal. After it receives the electrical signal from the receiver antenna 402, the receiver 403 modifies the phase of the electrical signal according to the command from the radar array controller 104 and the measures the modified electrical signal's frequency and amplitude.

In general, the radar return of a MIMO radar array may be processed to generate a significantly larger number of virtual elements (also referred to herein as virtual antennas or virtual transceivers). Broadly speaking, each pair of transmitters and receivers of the MIMO radar array correspond to a virtual element, which are essentially equivalent to a transmitter and receiver pair sharing an antenna. More precisely, a 2D MIMO radar array with a MIMO transmitter array having m transmitter antennas and a MIMO receiver array having n receiver antennas can provide resolution equivalent to a 2D planar array having m*n transceiver antennas (e.g., having m rows of n columns of antennas that generate a signal (with a common frequency but possibly different phase) and that can (individually) measure the frequency and phase of a received signal). The way this is accomplished is by having each transmitter element 203 transmit a sub-signal that is independent and orthogonal to the sub-signals transmitted by any other transmitter element 203. Similarly, each receiver element 205 can independently receive and measure an echo of the combined sub-signals independent from any other receiver element 205.

These two abilities, along with the layout and spacing of the transmitter antennas and receiver antennas, enable each signal (i.e., the combination of the sub-signals generated by transmitter elements 203) measured by a receiver antenna 208 to be processed to extract and identify (properties of) the sub-signals. These extracted sub-signals (e.g., n sets of m sub-signals) can then be used to form a virtual array with an m*n constellation of virtual antennas and to calculate the value of the signal (as measured by the receiver elements 205) for each of those virtual antennas. For a virtual array created by a full (i.e., non-sparse) transmitter array and receiver array, the virtual array constellation may itself be a full virtual array that forms an evenly spaced grid of virtual antennas. For a virtual array created by a sparse (and strictly non-full) transmitter array or receiver array (or both), the virtual array constellation may itself be a sparse (and strictly non-full) virtual array that forms an arbitrary pattern of virtual antennas.

Figure 5:
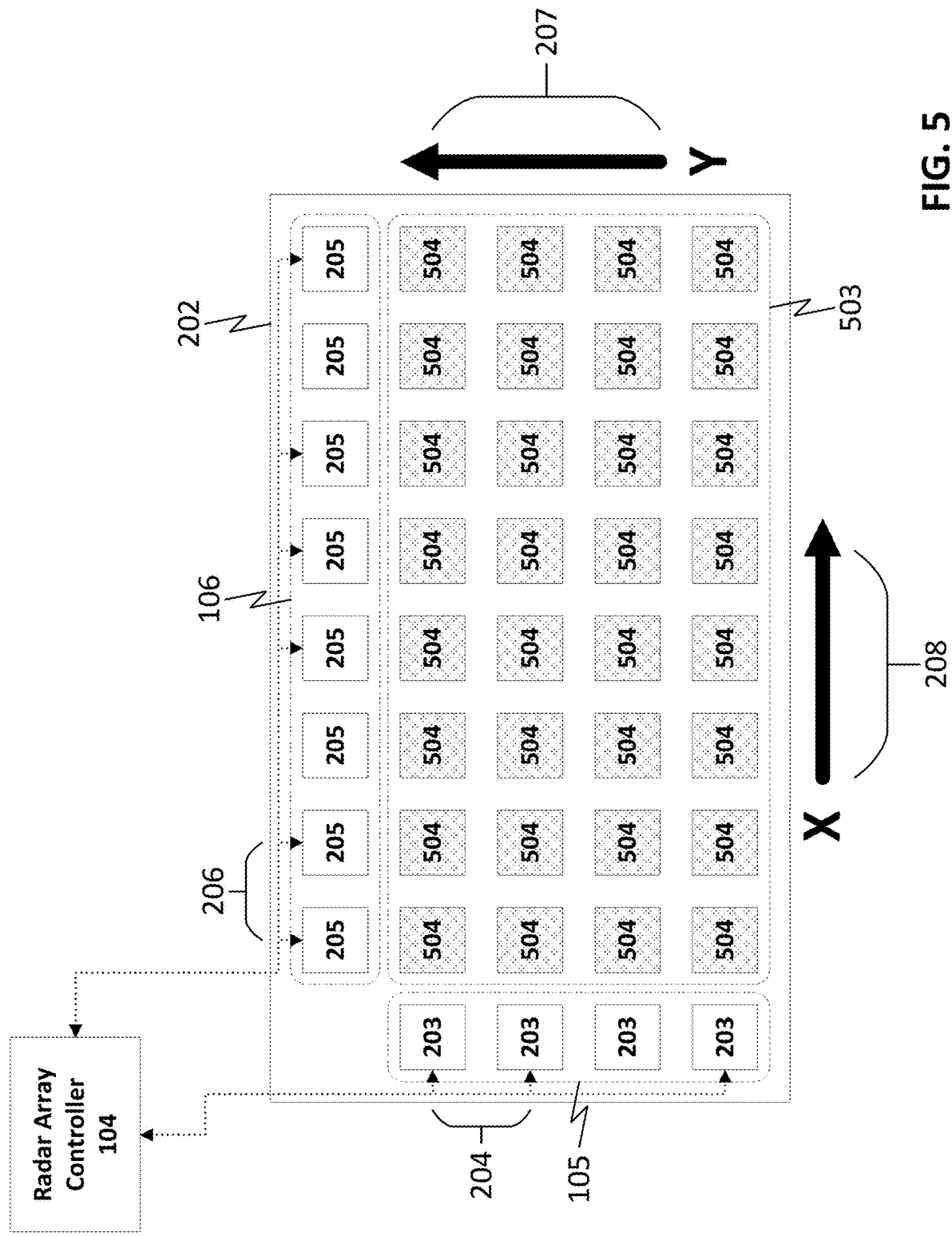
FIG. 5 is a block diagram of a virtual array created by a MIMO radar array, such as the MIMO radar array of FIG. 2.

For example, FIG. 5 shows a diagram of a virtual array created by the MIMO radar array of FIG. 2. As shown by the figure, careful processing of the signals received by transmitter elements 203 can yield a virtual array 503. The virtual array 503 comprises virtual elements 504, with the value of the signal "measured" by the virtual elements 504 being computed using the sub-signals (originating from the transmitter elements 203) extracted from the signal measured by each of the receiver elements 205. As shown here, the MIMO radar array 202 and its associated virtual array 503 are shown as being "full." In general, embodiments of the present disclosure may generally be used with sparse MIMO arrays having arbitrary transmitter and receiver element placements.

Note that what makes the MIMO radar array 202 and its associated virtual array 503 "full" is the spacing and position of the transmitter elements 203 and the receiver elements 205. In other words, a full virtual array is one where every virtual antenna is uniformly distributed in a grid with a spacing of one half of the transmitted radar signal's wavelength. A full MIMO array is an arrangement of transmitter elements 203 and receiver elements 205 that generates a full virtual array. Many arrangements of transmitter antennas and receiver antennas can yield a full MIMO array. For a MIMO array such as the MIMO array 202, where the transmitter elements 203 are aligned along one direction and the receiver elements 205 are aligned along an orthogonal direction, a full MIMO array requires that each transmitter element 203 be uniformly spaced (i.e., spaced with the y-axis spacing distance 204) with no gaps and that each receiver element 205 be likewise uniformly spaced (i.e., spaced with the x-axis spacing distance 206) with no gaps.

For MIMO arrays arranged like the 2D MIMO array 202, if either the transmitter and receiver elements are not uniformly spaced one half wavelength apart (e.g., are arbitrarily positioned) or there are gaps in the spacing between transmitter elements 203 or receiver elements 205, the array is called a sparse MIMO array. In particular, the former may be referred to as a non-uniformly spaced sparse array and the latter may be referred to as a uniformly spaced sparse array. When processed, a sparse MIMO array yields a sparse virtual array.

Figure 6:
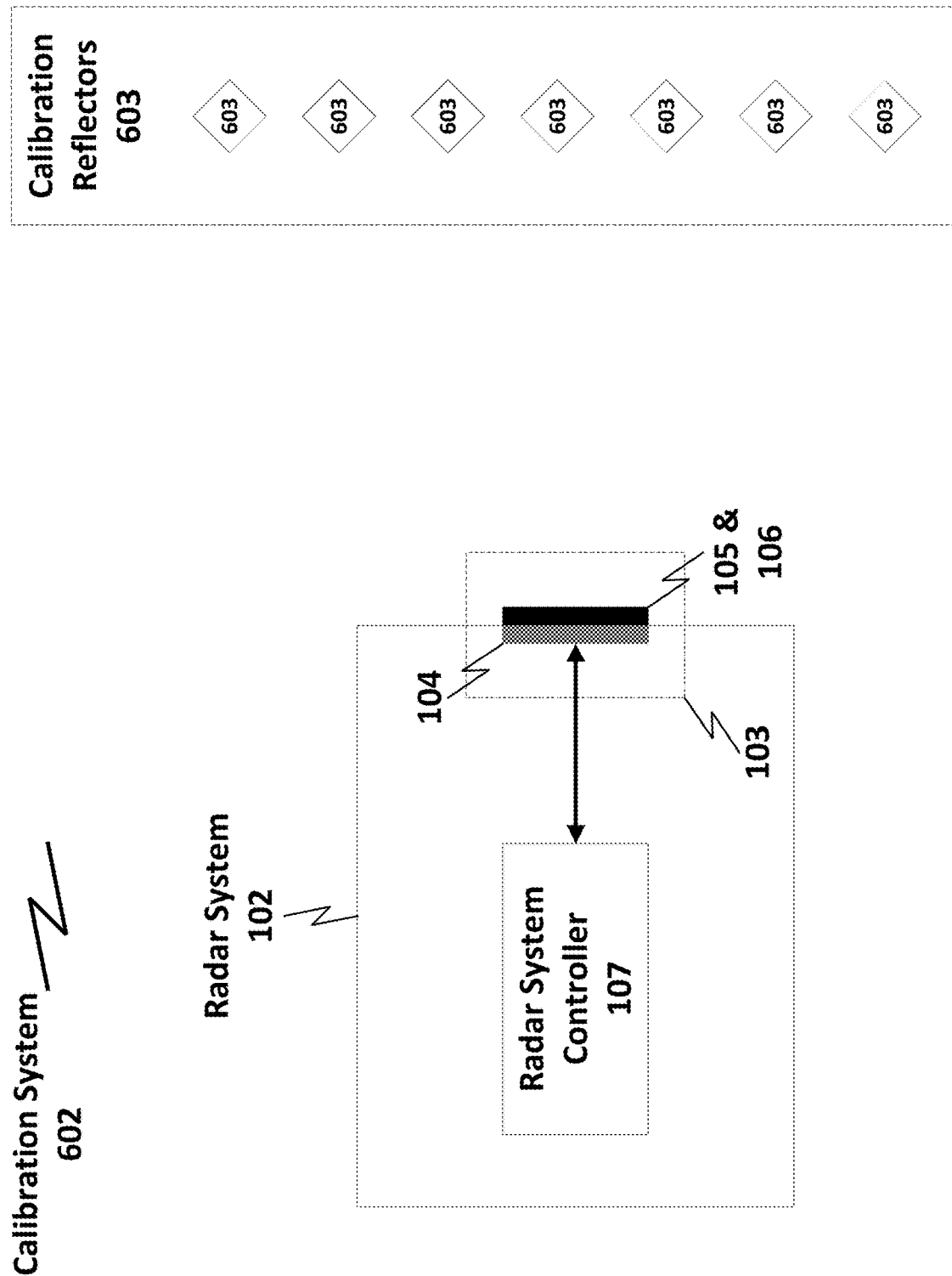
FIG. 6 is a block diagram of a radar calibration system in accordance with an exemplary embodiment of the present disclosure.

FIG. 6 is a block diagram of a radar calibration system, in accordance with an exemplary embodiment of the present disclosure. As shown by the figure, a radar calibration system 602 may comprise a radar system, shown here as the radar system 102 and one or more calibration reflectors 603. At a high level, the radar calibration system 602 works in-part by providing a series of radar-reflective objects—the calibration reflectors 603—that are distributed throughout a field of view of a radar system being calibrated. Importantly, these calibration reflectors' relative angles to the radar system are known to a significant degree of accuracy (e.g., within ±2 milliradians). By placing a radar system being calibrated at a proper position facing the calibration reflectors 603, these known calibration reflector placement angles may be used to configure a radar system so as to correct for any deviances in the radar system's non-uniform, angle-dependent antenna responses.

Specifically, by knowing where the MIMO radar array 103 of the radar system is positioned relative to the calibration reflector 603, the angle of reflected radar signal echoes from each calibration reflector 603 (i.e., the angle at which the reflected signals impinge on the MIMO receiver array 106) may be determined. The radar system 102 may then operate to ascertain what the response, including measured angle, is determined for each receiver antenna. The difference between the expected and actual positioning information determined for the calibration reflectors 603 may then be attributed to variances in the antenna array's response and used to determine a calibration factor. The calibration factor may be chosen such that, when used to correct the associated antenna's response, the corrected radar return is what would have been measured by the antennas of the MIMO receiver array 106 if each antenna had—within a margin of error—no non-uniform responses for the relevant angle.

Figure 7:
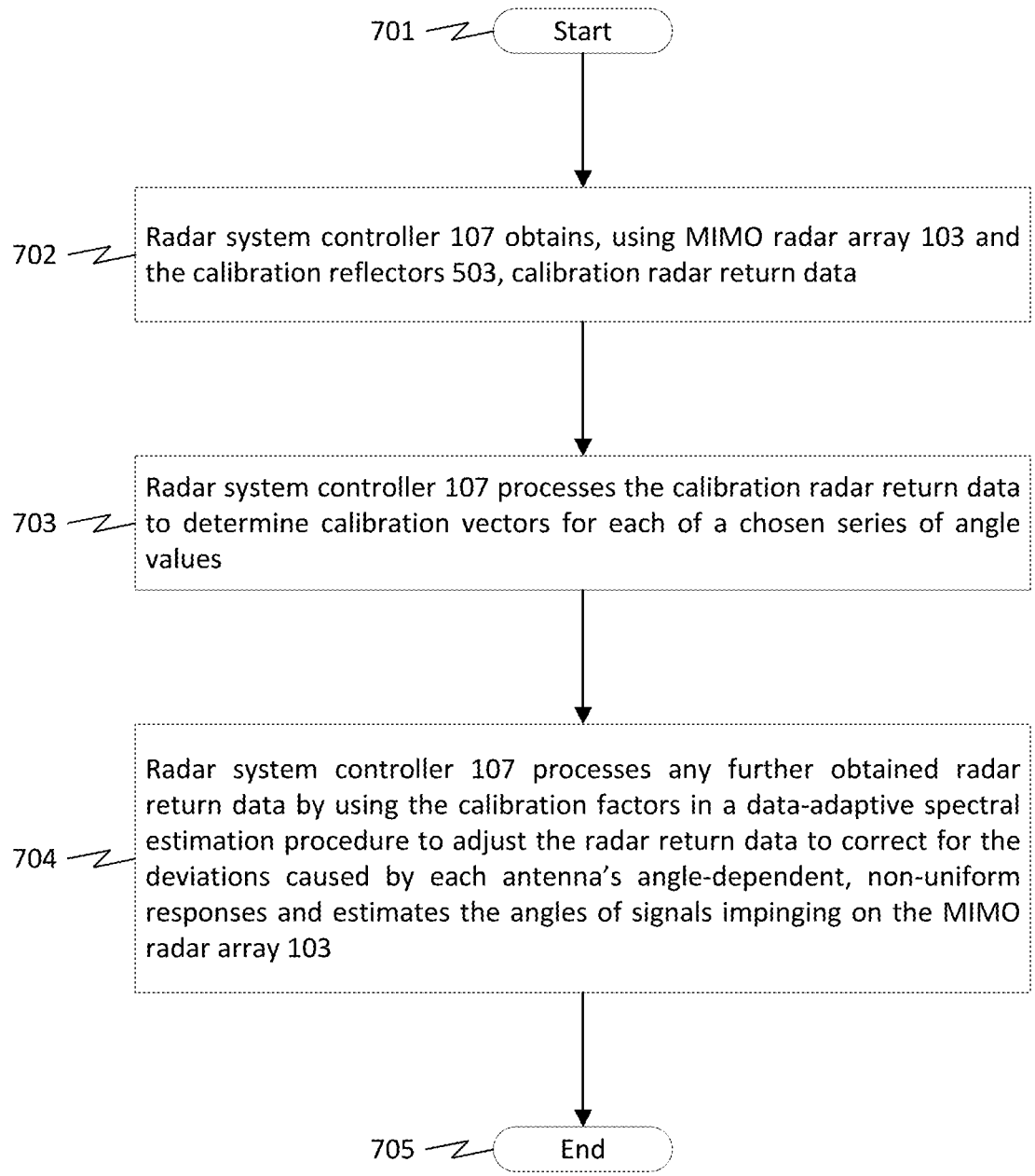
FIG. 7 is a flowchart of an exemplary method of calibrating a MIMO radar system to account for angle-dependent inter-transceiver response variances, in accordance with an exemplary embodiment of the present disclosure.

FIG. 7 is a flowchart of an exemplary method of calibrating radar systems as described above. To start, the radar system 102 may operate so as to obtain calibration radar return data. More precisely, as shown by block 702 of FIG. 7, the radar system controller 107 may obtain, using MIMO radar array 103 and the calibration reflectors 603, calibration radar return data. Generally, this may involve the radar system controller 107 interacting with the MIMO transmitter array 105 to transmit various radio signals towards the calibration reflectors and with the MIMO receiver array 106 to measure received echoes of those radar signals reflected back by the calibration reflectors 603. The radar system controller 107 may process these measurements to determine the apparent responses of the antennas of the MIMO receiver array 106.

After the radar system 102 obtain the calibration radar return data, the radar system 102 may determine calibration vectors using the calibration radar return data. More precisely, as shown by block 703 of FIG. 7, the radar system controller 107 may process the calibration radar return data to determine calibration vectors for each of a chosen series of angle values.

After the radar system determines the calibration vectors, the radar system controller 107 may utilize the calibration vectors to adjust later obtained radar return data. More precisely, as shown by block 704 of FIG. 7, the radar system controller 107 may process any further obtained radar return data by using the calibration factors in a data-adaptive spectral estimation procedure to adjust the radar return data to correct for the deviations caused by each antenna's angle-dependent, non-uniform responses.

In particular, antenna-dependent and, for each antenna, angle-dependent deviations in the measured radar return reflected from a scatterer may be calculated from unexpected differences in the phase and/or amplitude of a measured radar signal return as measured by each of the receiver antennas.

Figure 8:
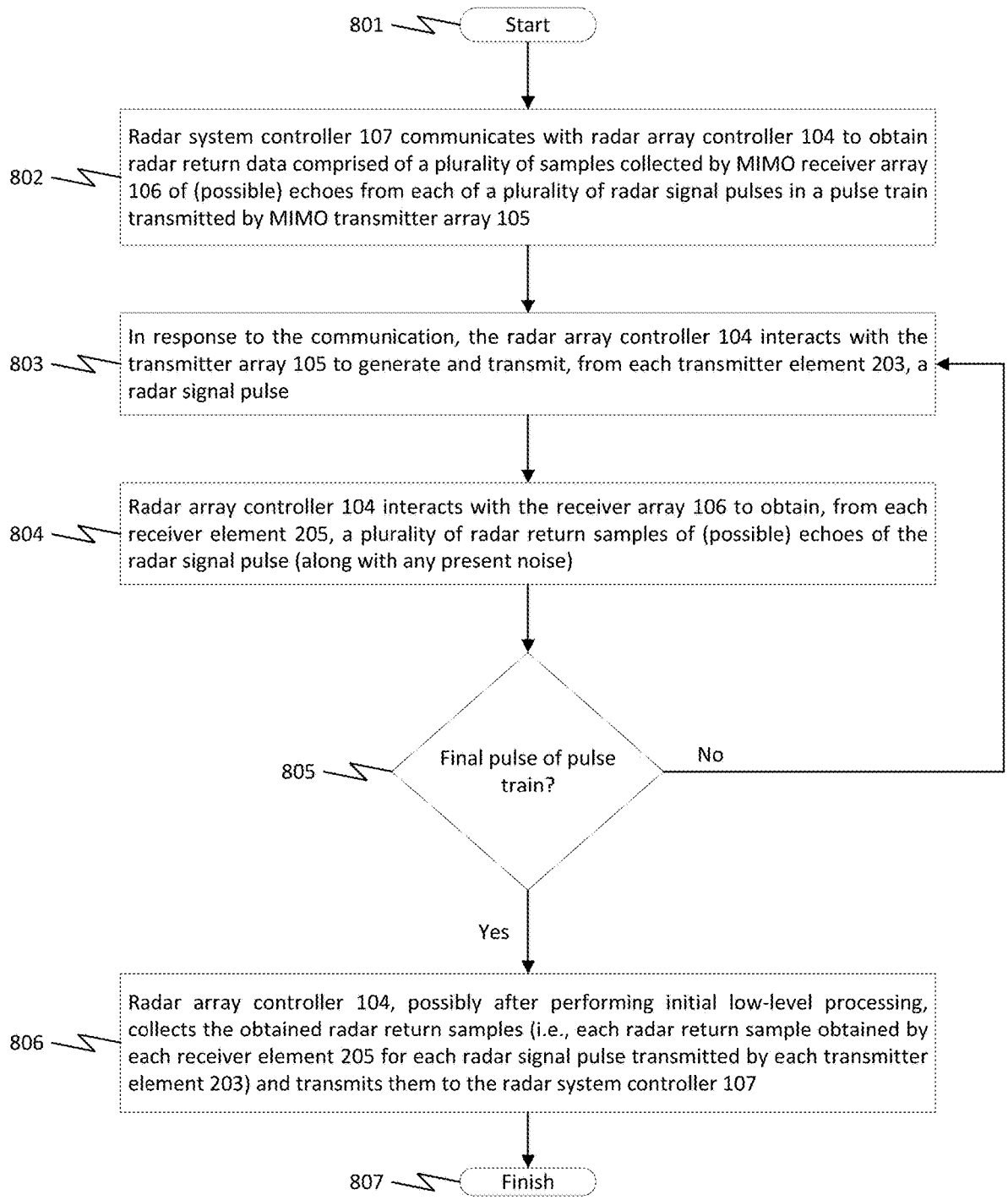
FIG. 8 is a flowchart of an exemplary method of obtaining calibration radar return data using a MIMO radar system, in accordance with an exemplary embodiment of the present disclosure.

FIG. 8 is a flowchart illustrating an exemplary process of generating a radar signal and measuring its reflections, as mentioned above in block 702 of FIG. 7. To start, as shown by block 802 of FIG. 8, the radar system controller 107 communicates with the radar array controller 104 to obtain radar return data. Specifically, the radar return data comprises a plurality of samples collected by MIMO receiver array 106 of (possible) echoes from each of a plurality of radar signals pulses transmitted by MIMO transmitter array 105.

In response to the communication, the radar array controller 104 may interact with the transmitter array 105 to generate and transmit a radar signal pulse. Specifically, as shown by block 803 of FIG. 8, the transmitter array 105 may generate and transmit a radar signal pulse from each transmitter element 203.

After interacting with the transmitter array 105, the radar array controller 104 may interact with the receiver array 106 to receive and record radar return samples. Specifically, as shown by block 804 of FIG. 8, the transmitter array 105 may receive and record samples of (possible) echoes of the transmitted radar signal pulses (along with any present noise) at each receiver element 205.

After recording several radar return samples (by each receiver element 205), as shown by block 805 of FIG. 8, it is determined if the latest radar signal pulse transmitted from the receiver array 106 is the final radar signal pulse in the pulse train. If the radar signal pulse is not the final pulse, the method proceeds to block 803 of FIG. 8. Conversely, if the radar signal pulse is the final pulse, the method proceeds to block 806 of FIG. 8.

More precisely, if the radar signal pulse is determined not to be the final pulse in block 805 of FIG. 8, the next radar signal pulse is transmitted and then listened for. In particular, the method returns to block 803 of FIG. 8 and proceeds with the next signal pulse in the pulse train.

On the other hand, if the radar signal is determined to be the final pulse in block 805 of FIG. 8, the process of collecting and transmitting the recorded radar returns samples is performed. Specifically, as shown in block 806 of FIG. 8, collects all the recorded radar return samples, optionally performs some initial low-level processing, and then transmits the collected radar return samples to the radar system controller 107.

Figure 9:
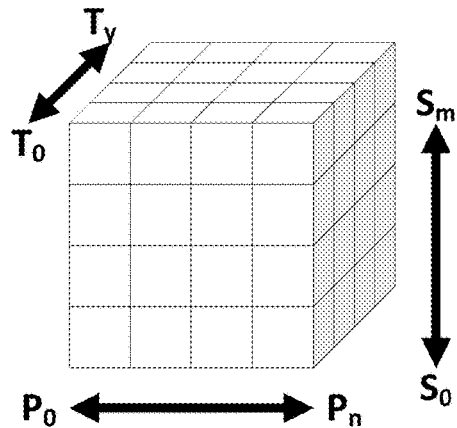
FIG. 9 is an illustration showing radar return data as a 4-dimensional (4D) data cube of radar return samples, in accordance with an exemplary embodiment of the present disclosure.
Figure 9:
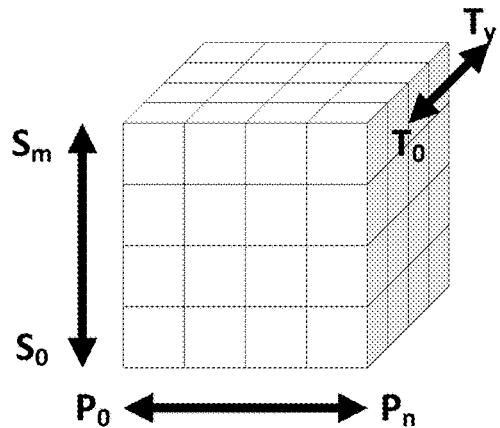
Figure 9:
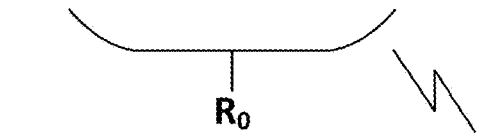
Figure 9:
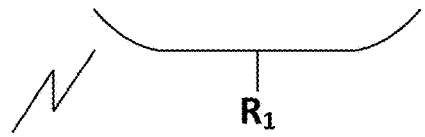
Figure 9:
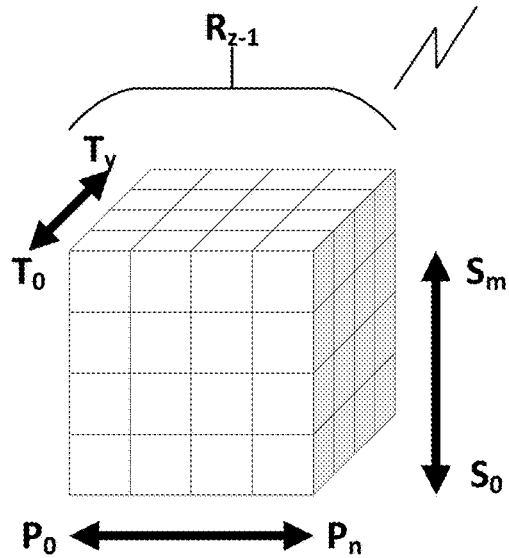
Figure 9:
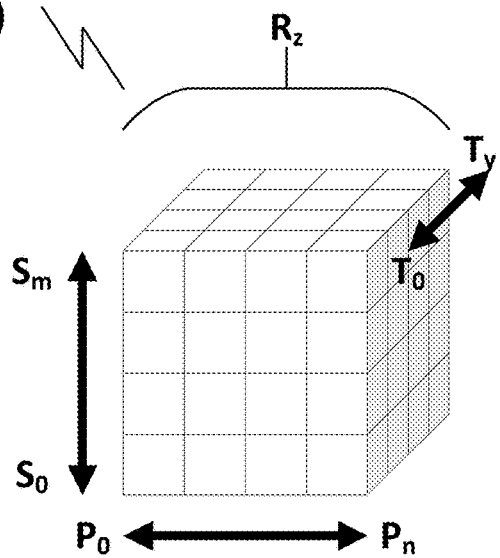

FIG. 9 shows an illustration of a 4D data cube like the one just described. In particular, the figure shows several three-dimensional (3D) data cubes—which, collectively, comprise a 4D data cube, with each such 3D data cube corresponding to a receiver number $R_0$ to $R_z$. Each data cube has several radar return samples, with each radar return sample being indexed by pulse number Po to $P_n$, transmitter number $T_0$ to $T_y$, and sample number $S_0$ to $S_m$.

Figure 10:
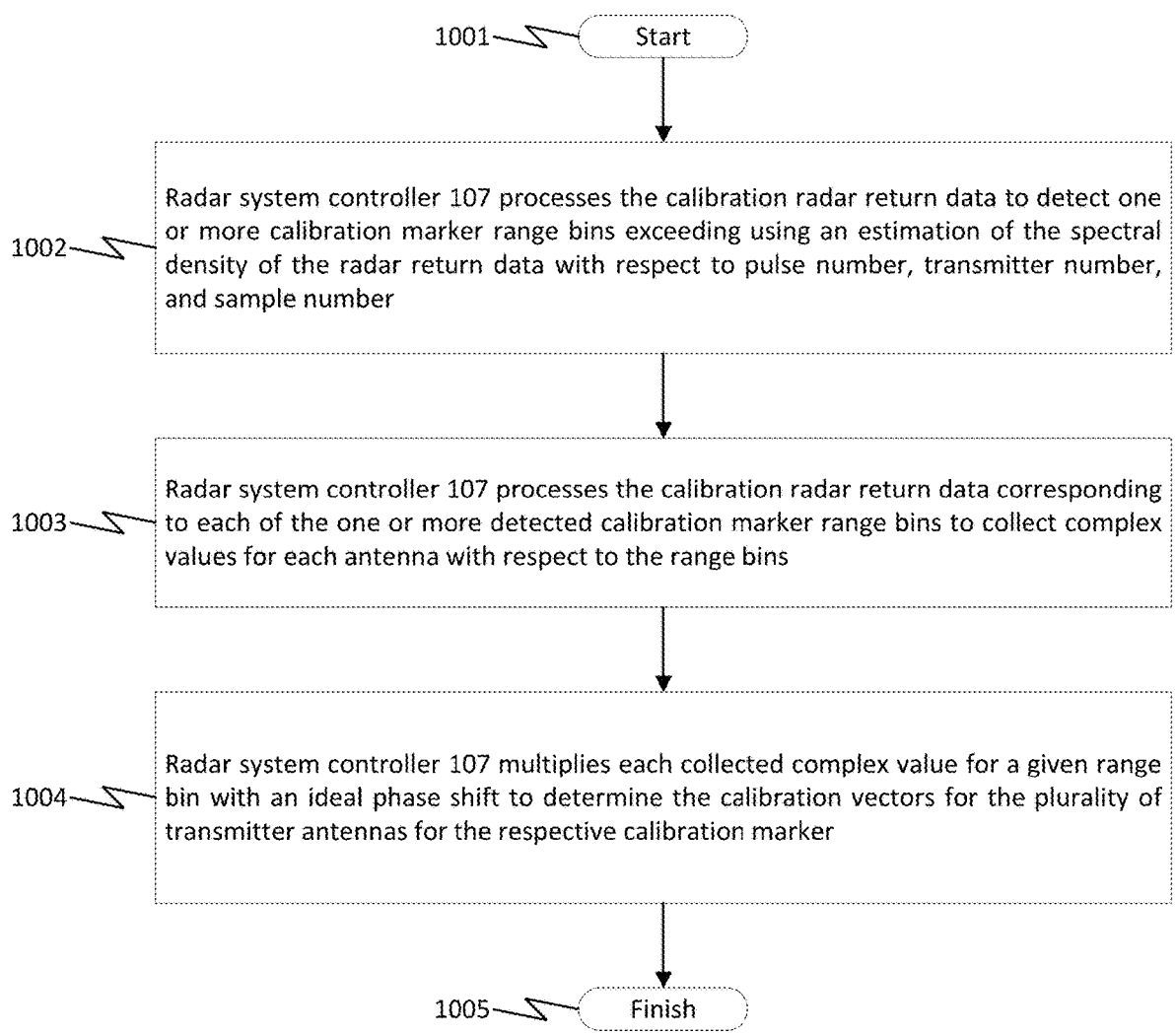
FIG. 10 is a flowchart of an exemplary method of determining calibration vectors for a MIMO radar system, in accordance with an exemplary embodiment of the present disclosure.

FIG. 10 is a flowchart of an exemplary method of determining calibration vectors for a MIMO radar system, as mentioned above in block 703 of FIG. 7. To start, the radar system controller 107 may process the radar return data to detect one or more calibration reflector range bins. More precisely, as shown by block 1002 of FIG. 10, the radar system controller 107 may process the calibration radar return data using a spectral density estimation technique (e.g., the Fourier transform) to determine the (discrete) spectral density (i.e., the intensity of a received signal as a function of frequency) of the calibration radar return data with respect to pulse number and sample number. Each discrete frequency bin of the estimated spectral density (representing a two-dimensional frequency) corresponds to an RD bin. The radar system controller 107 may then process the RD bins to identify the range bins that are local maxima (i.e., the RD bins whose associated frequency intensity is not less than the frequency intensity of any immediately neighboring RD bins). These local maxima indicate a detected calibration reflector.

For example, if a trihedral is placed at boresight of the radar antenna at a distance R (with R>5 m) and the radar antenna is accurately rotated in azimuth from −45° to 45° with a granularity of a fraction of a degree, the process may involve equalizing the response of each transmit-receive pair for every angle under examination. For a fixed angle, the radar may transmit a dwell of FMCW pulses and process the data and form range bins and the DC Doppler bin. The system may find the range bin that contains the radar return from the trihedral for all virtual elements. If necessary, the system may perform a range shift in fast frequency so that the trihedral appears at the same range for all virtual elements.

After detecting the one or more calibration reflector range bins, the radar system controller 107 processes each calibration reflector range bin to collect complex values for antenna. More precisely, as shown by block 1003 of FIG. 10, the radar system controller 107 may, for each calibration reflector range bin, process the calibration reflector's RD bin's associated calibration radar return data to collet complex values for each antenna with regards to the RD bin. Each discrete frequency bin of a calibration RD bin's estimated spectral density corresponds to an azimuth bin associated with the candidate detection RD bin. At this point, the radar system may, for each transceiver, collect the complex data at the same range bin. The collected complex data may then be multiplied by the ideal phase shift to yield calibration vectors $\beta_n(\Theta_k, \phi_k)$ for each of the virtual transceivers, where $\beta_n(\Theta_k, \phi_k)$ is the calibration vector at azimuth $\theta_k$ (i.e., the azimuth angle of the $k^{th}$ scatterer) and elevation $\phi_k$ (i.e., the elevation angle of the $k^{th}$ scatterer) for the $n^{th}$ virtual transceiver.

For instance, after initial processing, the available samples can be represented as a vector $\vec{y}_g = [y_{g_1} \ldots y_{g_n} \ldots y_{g_N}]^T$, where $N = N_T N_R$, $N_T$ is the number of transmitters and $N_R$ is the number of receivers. This can be represented as $$\vec{y}_g = \sum_{k=1}^{K} \left( z_k \cdot \begin{bmatrix} e^{j(\omega_{x_1}(\theta_k, \phi_k) + \omega_{y_1}(\theta_k, \phi_k))} \\ \vdots \\ e^{j(\omega_{x_N}(\theta_k, \phi_k) + \omega_{y_N}(\theta_k, \phi_k))} \end{bmatrix} \cdot \vec{\beta}(\theta_k, \phi_k) \right),$$

where $z_k$ is the complex amplitude (identical across the receivers, for a given scatterer), $\theta_k$ is the azimuth angle of the incoming signal from the $k^{th}$ scatterer, $\phi_k$ is the elevation angle of the incoming signal from the $k^{th}$ scatterer, and $\vec{\beta}(\theta_k, \phi_k)$ is the calibration vector at $\theta_k$, $\phi_k$.

After processing each calibration reflector RD bin and collecting complex values for each antenna for each of the calibration reflector RD bins, the radar system controller 107 may multiply each collected complex value with an ideal phase shift to determine the calibration vectors. Specifically, as shown by block 1004 of FIG. 10, the radar system controller 107 may multiply each collected complex value for a given range bin with an ideal phase shift to determine the calibration vectors for the plurality of transmitter antennas for the respective calibration reflector. The ideal phase shift at the $n^{th}$ virtual transceiver for a signal received from azimuth $\theta_q$ and elevation $\phi_m$ may be represented as $$e^{j2\pi \frac{d_{x_n}}{\lambda} \sin \theta_q \cos \phi_m} e^{j2\pi \frac{d_{y_n}}{\lambda} \sin \phi_m}.$$

Ideally each phasor at $n^{th}$ virtual transceiver should be $$e^{j(\omega_{x_n}(\theta_k, \phi_k) + \omega_{y_n}(\theta_k, \phi_k))},$$

where $\theta_k$ and $\phi_k$ are respectively the azimuth and elevation angles of the trihedral relative to the antenna plane. Due to antenna transceiver coupling, backboard wiring, current interaction, and other similar mechanisms, there are phase discrepancies equal to $$a_{n,k} e^{j\psi_{n,k}} = \beta_n(\theta_k, \phi_k) e^{j(\omega_{x_n}(\theta_k, \phi_k) + \omega_{y_n}(\theta_k, \phi_k))},$$

where $\omega_{x_n}(\theta, \phi) = 2\pi \frac{d_{x_n}}{\lambda} \sin\theta \cos \phi$, $\omega_{y_n}(\theta, \phi) = 2\pi \frac{d_{y_n}}{\lambda} \sin \phi$, $d_{x_n}$ is the distance of the $n^{th}$ virtual transceiver from the $1^{st}$ virtual transceiver along the x-axis, and $d_{y_n}$ is the distance of the $n^{th}$ virtual transceiver from the $1^{st}$ virtual transceiver along the y-axis. The purpose of calibration is to estimate $\beta_n(\theta_k, \phi_k)$ and compensate for its effect in the raw data $\vec{y}_g$.

Figure 11:
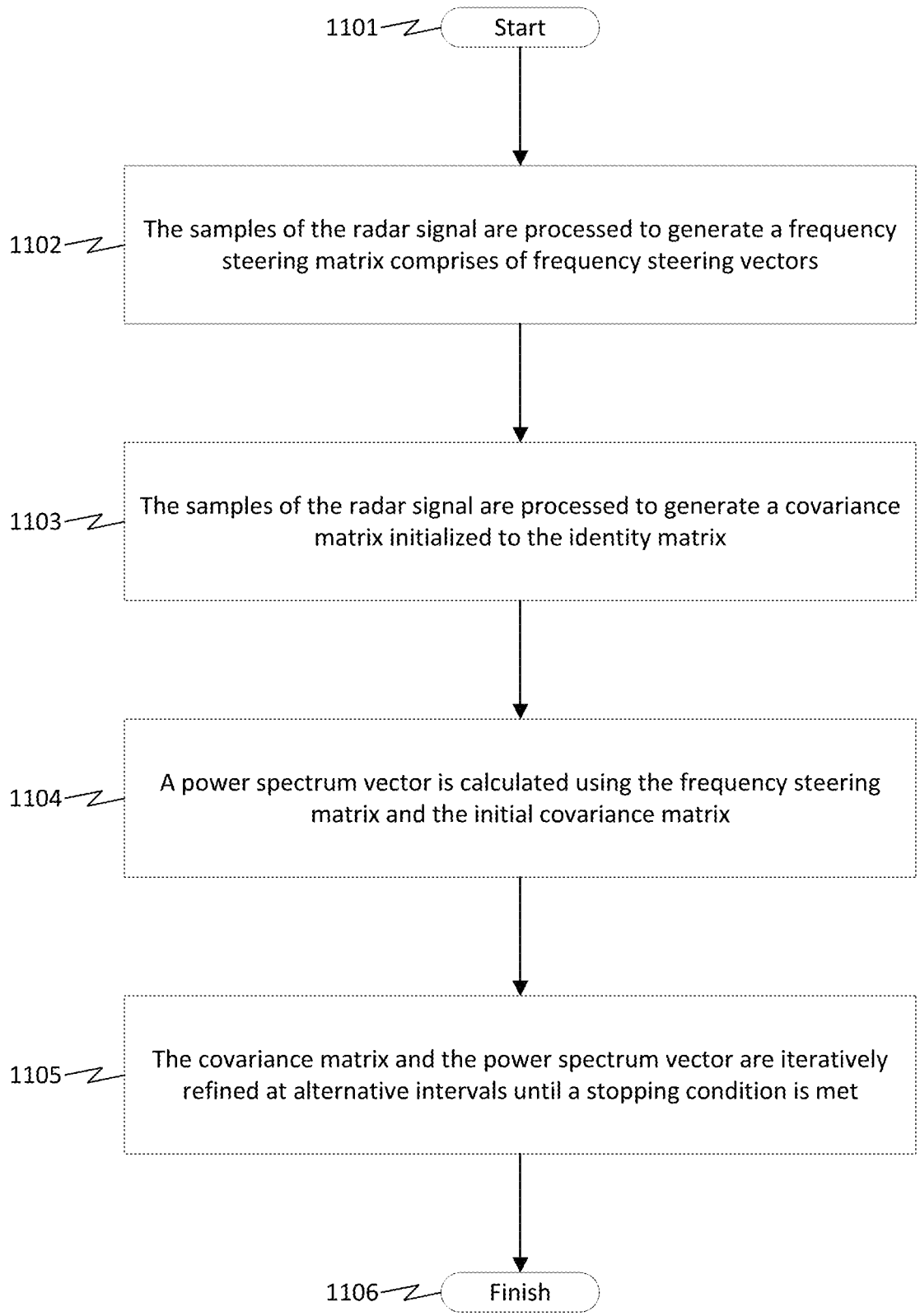
FIG. 11 is a flowchart of an exemplary method of using calibration vectors to correct for angle-dependent, inter-transceiver response variances obtained radar return data, in accordance with an exemplary embodiment of the present disclosure.

FIG. 11 is a flowchart illustrating an exemplary process of using calibration vectors to correct for angle-dependent, inter-transceiver response variances obtained radar return data, as mentioned above in block 704 of FIG. 7.

To start, the radar system controller 107 may process the radar return data to generate a frequency steering matrix. More precisely, as shown by block 1102 of FIG. 11, the radar system controller 107 may process the radar return data to generate a frequency steering matrix. The receiver phase steering matrix is a two-dimensional matrix where each row represents the value of a receiver frequency component of the radar signal measured by each of the receiver elements 205. The columns of the matrix (called a phase steering vector or a frequency steering vector) represent frequency steering vectors computed at frequency sub-intervals which are determined by dividing the interval between −0.5 and 0.5 into r*i sub-intervals, where r is the number of receiver elements 205 in the MIMO receiver array 106 and i is a sub-division factor. Each column of the matrix represents a frequency steering vector and corresponds to one of these frequency sub-intervals. To populate the matrix, for each row, the value of the radar return samples obtained from the corresponding receiver element 205 is used. Essentially, the matrix is filled out as if all the value of a signal came from any (and all) of the specific frequency steering vectors computed at frequency sub-intervals, with later steps determining which frequency sub-interval (or intervals) contribute to the signal's amplitude.

For an overview of IAA, let $\vec{y}_g = [y_{g_1} \ldots y_{g_n} \ldots y_{g_N}]^T$ be a vector of available samples, with the goal of estimating the angular spectrum of $\vec{y}_g$ in Azimuth and Elevation. Denote the frequency grids of interest along the x and y axes by:

$$\tilde{\omega}_x(q) = 2\pi \frac{q-1}{Q},$$

$q \in \{1, \ldots, Q\}$ and $$\tilde{\omega}_y(m) = 2\pi \frac{m-1}{M},$$

$m \in \{0, \ldots, M\}$, where $\vec{\tilde{\omega}}_x = [\tilde{\omega}_x(1) \ldots \tilde{\omega}_x(q) \ldots \tilde{\omega}_x(Q)]$ and $\vec{\tilde{\omega}}_y = [\tilde{\omega}_y(1) \ldots \tilde{\omega}_y(m) \ldots \tilde{\omega}_y(M)]$. Typically, the frequency grids $\vec{\tilde{\omega}}_x$ and $\vec{\tilde{\omega}}_y$ are uniformly spaced and dense. For the selected frequency grids, the frequency steering vectors for the given samples may be denoted as $$\vec{d}_g(q, m) = \begin{bmatrix} e^{j2\pi \frac{d_{x_1}}{\lambda} \sin \tilde{\omega}_x(q) \cos \tilde{\omega}_y(m)} e^{j2\pi \frac{d_{y_1}}{\lambda} \sin \tilde{\omega}_y(m)} \\ \vdots \\ e^{j2\pi \frac{d_{x_N}}{\lambda} \sin \tilde{\omega}_x(q) \cos \tilde{\omega}_y(m)} e^{j2\pi \frac{d_{y_N}}{\lambda} \sin \tilde{\omega}_y(m)} \end{bmatrix}.$$

$\vec{\beta}(\tilde{\omega}_x(q), \tilde{\omega}_y(m))$, for each pair of frequencies $\tilde{\omega}_x(q)$, $\tilde{\omega}_y(m)$. Equivalently, for the same selected frequency grids, the frequency steering vectors for the given samples may be written as $$\vec{a}_g(q, m) = \begin{bmatrix} e^{j(\omega_{x_1}(\tilde{\omega}_x(q),\tilde{\omega}_y(m))+\omega_{y_1}(\tilde{\omega}_x(q),\tilde{\omega}_y(m)))} \\ \vdots \\ e^{j(\omega_{x_N}(\tilde{\omega}_x(q),\tilde{\omega}_y(m))+\omega_{y_N}(\tilde{\omega}_x(q),\tilde{\omega}_y(m)))} \end{bmatrix} \cdot \vec{\beta}(\tilde{\omega}_x(q), \tilde{\omega}_y(m)),$$

for each pair of frequencies $\tilde{\omega}_x(q)$, $\tilde{\omega}_y(m)$. The frequency steering matrix for the given samples may be denoted as $A_g = [\vec{a}_g(1,1) \ldots \vec{a}_g(1,M) \vec{a}_g(2,1) \ldots \vec{a}_g(Q,M)]$. Using $A_g$, the given samples $\vec{y}_g$ may be represented as $\vec{y}_g = A_g \vec{\alpha}$, where $\vec{\alpha}$ is the complex spectral envelope of $\vec{y}_g$ and $\vec{\alpha} = [\alpha(1,1) \ldots \alpha(1,M) \alpha(2,1) \ldots \alpha(Q,M)]^T$.

After generating the frequency steering matrix, as shown by block 1103 of FIG. 11, the radar system controller 107 may process the radar return data to generate a noise covariance matrix which indicates which represents the interference and noise covariance of the radar return samples obtained by the receiver elements 205. The noise covariance matrix may be first initialized to an identity matrix.

Under this previous setup, $\vec{\alpha}$ may be estimated from $\vec{y}_g$ by the following super-resolution recursive method described below. First, let $P(q,m) = |\alpha(q,m)|^2$; $P(q,m)$ is the signal power at frequency $\omega_x(q)$, $\omega_y(m)$. For each signal at frequency $\omega_x(q)$, $\omega_y(m)$ in the available data, the interference covariance matrix is defined as $Q_g(q,m) = R_g - P(q,m)\vec{a}_g(q,m)\vec{a}_g^H(q,m)$, where $R_g$ is the covariance matrix of the given data and is defined as $R_g =$ $$\sum_{q=1}^{Q} \sum_{m=1}^{M} P(q, m)\vec{a}_g(q, m)\vec{a}_g^H(q, m).$$

After generating the initial noise covariance matrix, as shown by block 1104 of FIG. 11, the radar system controller 107 may process the radar return data to generate a power spectrum vector using the current covariance matrix and the calculated frequency steering matrix.

Using a weighted least squares approach, the complex envelope $\alpha(q,m)$ may be estimated by calculating $$\min_{\alpha(q,m)} \{(\vec{y}_g - \alpha(q, m)\vec{a}_g(q, m))^H Q_g(q, m)^{-1} (\vec{y}_g - \alpha(q, m)\vec{a}_g(q, m))\}.$$

Solving this calculation for the minimum $\alpha(q,m)$, denoted as $\hat{\alpha}(q,m)$, yields $$\hat{\alpha}(q, m) = \frac{\vec{a}_g^H(q, m)Q_g^{-1}\vec{y}_g}{\vec{a}_g^H(q, m)Q_g^{-1}\vec{a}_g(q, m)}.$$

Using the fact (derivable from the matrix inversion lemma) that $$\vec{a}_g^H(q, m)Q_g^{-1} = \frac{\vec{a}_g^H(q, m)R_g^{-1}}{1 - P(q, m)\vec{a}_g^H(q, m)R_g^{-1}\vec{a}_g(q, m)},$$

$\hat{\alpha}(q,m)$ may be simplified to $$\hat{\alpha}(q, m) = \frac{\vec{a}_g^H(q, m)R_g^{-1}\vec{y}_g}{\vec{a}_g^H(q, m)R_g^{-1}\vec{a}_g(q, m)}.$$

For the first iteration of calculating $\hat{\alpha}(q,m)$, $R_g = I$, where I denotes the identity matrix.

Next, as shown by block 1105 of FIG. 11, the power spectrum vector and the covariance matrix may be iteratively refined from the updated version of the other until a stopping condition is reached. In other words, the covariance matrix may be updated to a new covariance matrix that was calculated using the frequency steering matrix and the current power spectrum vector. The power spectrum vector may be updated to a new power spectrum vector that was calculated using the frequency steering matrix and the current (and newly updated in the previous step) power spectrum vector. This process may then repeat for the covariance matrix. Empirically, around 10 to 15 iterations of this process is typically sufficient such that further iterations give little or no increase in accuracy. Once the process is finished, the power spectrum vector represents the spectral density of the signal.

In some embodiments, a non-transitory computer-readable storage medium including instructions is also provided, and the instructions may be executed by a device, for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The devices, modules, and other functional units described in this disclosure can be implemented by hardware, or software, or a combination of hardware and software. One of ordinary skill in the art will also understand that the above described devices, modules, and other functions units may be combined or may be further divided into a plurality of sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

The invention claimed is:

1. A method of calibrating a radar system, comprising:
obtaining first radar return data from a multiple-input and multiple-output (MIMO) antenna array, wherein:
the first radar return data comprises one or more samples of a radio wave signal impinging on a MIMO receiver array of the MIMO antenna array, wherein each of the one or more samples of the radio wave signal comprises one or more sub-samples of a radio wave signal impinging on respective receiver antennas of a plurality of receiver antennas of the MIMO receiver array; and
the radio wave signal impinging on the MIMO receiver array comprises a combination of radar signal echoes of one or more radar signals reflected by one or more calibration reflectors, wherein each of the radar signal echoes impinge on the MIMO receiver array at a pair comprising a respective azimuth angle and a respective elevation angle; and
each of the one or more radar signals is generated by a MIMO transmitter array of the MIMO antenna array, wherein each of the one or more radar signals comprises one or more mutually orthogonal radar sub-signals generated by one or more transmitter antennas of the MIMO transmitter array;
processing the first radar return data to determine, for each respective pair of azimuth angle and elevation angle of the radar signal echoes, a calibration vector, wherein the calibration vector comprises a calibration factor for each of the plurality of receiver antennas; and
processing received radar signals according to the determined calibration vectors by:
generating a frequency steering matrix for the MIMO antenna array, wherein the frequency steering matrix comprises, for each of a plurality of pairs of azimuth angles and elevation angles within a range of pairs of azimuth angles and elevation angles, a product of a frequency steering vector associated with the respective pair of azimuth angle and elevation angle and the calibration vector associated with the respective pair of azimuth angle and elevation angle;
generating a current covariance matrix of the first radar return data that is initialized to an identity matrix; and
iteratively calculating, until a stopping condition is met, a current power spectrum vector of the first radar return data by:
calculating a new power spectrum vector using the frequency steering matrix and the current covariance matrix;
calculating a new covariance matrix using the frequency steering matrix and the new power spectrum vector; and
updating the current power spectrum vector to the new power spectrum vector and updating the current covariance matrix to the new covariance matrix.

2. The method of claim 1, wherein:
each of the radar signal echoes impinging on the MIMO receiver array impinge at a respective elevation angle;
each of the one or more radar signals generated by the MIMO transmitter array comprises a plurality of mutually orthogonal radar sub-signals generated by a plurality of transmitter antennas of the MIMO transmitter array;
processing the first radar return data to determine the calibration vectors further comprises processing the first radar return data to determine, for each respective pair of azimuth angle and elevation angle of the radar signal echoes, a calibration vector, wherein the calibration vector comprises a calibration factor for each pair one of the of the plurality of receiver antennas and one of the plurality of transmitter antennas; and
processing received radar signals according to the determined calibration vectors further comprises generating the frequency steering matrix for the MIMO antenna array, wherein the frequency steering matrix comprises, for each pair of one of the plurality of azimuth angles within the range of azimuth angles and one of a plurality of elevation angles within a range of elevation angles, a product of the frequency steering vector associated with the respective pair of azimuth angle and elevation angle and the calibration vector associated with the respective pair of azimuth angle and elevation angle.

3. The method of claim 1, wherein the MIMO antenna array is a sparse MIMO antenna array.

4. The method of claim 1, wherein processing the first radar return data to determine, for each respective pair of azimuth angle and elevation angle of the radar signal echoes, respective calibration vectors comprises:
determining, for each of the plurality of receiver antennas for each respective pair of azimuth angle and elevation angle of the radar signal echoes, expected radar return signal parameters of a signal model fitting the known coordinates of the antenna positions associated with each of the one or more transmitter antennas and the plurality of receiver antennas; and
determining, for each of the plurality of receiver antennas for each respective pair of azimuth angle and elevation angle of the radar signal echoes, actual radar return signal parameters of a signal model fitting the radar signal returns obtained using the antenna array; and determining, for each of the plurality of receiver antennas, values indicating magnitude of non-uniform responses to received radar signals with respect to a range of impinging angles.

5. The method of claim 4, wherein:
the determined expected radar return signal parameters comprise expected radar return signal amplitudes and phases for each receiver antenna with respect to each pair of azimuth angle and elevation angle; and
the actual radar return signal parameters comprise actual radar return signal amplitudes and phases for each receiver antenna with respect to each pair of azimuth angle and elevation angle.

6. A radar calibration system, comprising:
a multiple-input and multiple-output (MIMO) radar system configured to obtain first radar return data using a MIMO antenna array of the MIMO radar system, wherein:
  the MIMO antenna array comprises a MIMO transmitter array configured to generate one or more radar signals, wherein:
    the MIMO transmitter array comprises one or more transmitter antennas configured to generate mutually orthogonal radar sub-signals; and
    each of the one or more radar signals generated by the MIMO transmitter array comprises one or more mutually orthogonal radar sub-signals generated by the one or more transmitter antennas;
  the MIMO antenna array further comprises a MIMO receiver array configured to obtain one or more samples of a radio wave signal impinging on the MIMO receiver array, wherein:
    the MIMO receiver array comprises a plurality of receiver antennas configured to obtain one or more sub-samples of a radio wave signal impinging on each of the respective plurality of receiver antennas; and
    each of the one or more samples of the impinging radio wave signal obtained by the MIMO receiver array comprises one or more sub-samples of the radio wave signal impinging on respective receiver antennas of the plurality of receiver antennas; and
  the first radar return data comprises one or more samples obtained by the MIMO receiver array of an impinging radio wave signal, wherein:
    the impinging radio wave signal comprises a combination of radar signal echoes of one or more radar signals generated by the MIMO transmitter array and reflected by one or more calibration reflectors; and
    each of the radar signal echoes impinge on the MIMO receiver array at a pair comprising a respective azimuth angle and a respective elevation angle; and
the radar system further comprises a radar system controller configured to:
  process the first radar return data to determine, for each respective pair of azimuth angle and elevation angle of the radar signal echoes, a calibration vector, wherein the calibration vector comprises a calibration factor for each of the plurality of receiver antennas; and
  process received radar signals according to the determined calibration vectors by:
    generating a frequency steering matrix for the MIMO antenna array, wherein the frequency steering matrix comprises, for each of a plurality of pairs of azimuth angles and elevation angles within a range of pairs of azimuth angles and elevation angles, a product of a frequency steering vector associated with the respective pair of azimuth angle and elevation angle and the calibration vector associated with the respective pair of azimuth angle and elevation angle;
    generating a current covariance matrix of the first radar return data that is initialized to an identity matrix; and
    iteratively calculating, until a stopping condition is met, a current power spectrum vector of the first radar return data by:
      calculating a new power spectrum vector using the frequency steering matrix and the current covariance matrix;
      calculating a new covariance matrix using the frequency steering matrix and the new power spectrum vector; and
      updating the current power spectrum vector to the new power spectrum vector and updating the current covariance matrix to the new covariance matrix.

7. The system of claim 6, wherein:
the MIMO transmitter array comprises a plurality of transmitter antennas configured to generate mutually orthogonal radar sub-signals, wherein each of the one or more radar signals generated by the MIMO transmitter array comprises a plurality of mutually orthogonal radar sub-signals generated by the plurality of transmitter antennas;
each of the radar signal echoes impinging on the MIMO receiver array impinge at a respective elevation angle; and
the radar system controller is further configured to:
  process the first radar return data to determine the calibration vectors by processing the first radar return data to determine, for each respective pair of azimuth angle and elevation angle of the radar signal echoes, a calibration vector, wherein the calibration vector comprises a calibration factor for each pair one of the of the plurality of receiver antennas and one of the plurality of transmitter antennas; and
  process received radar signals according to the determined calibration vectors by generating the frequency steering matrix for the MIMO antenna array, wherein the frequency steering matrix comprises, for each pair of one of the plurality of azimuth angles within the range of azimuth angles and one of a plurality of elevation angles within a range of elevation angles, a product of the frequency steering vector associated with the respective pair of azimuth angle and elevation angle and the calibration vector associated with the respective pair of azimuth angle and elevation angle.

8. The system of claim 6, wherein the MIMO antenna array is a sparse MIMO antenna array.

9. The system of claim 6, wherein processing the first radar return data to determine, for each respective pair of azimuth angle and elevation angle of the radar signal echoes, respective calibration vectors comprises:
determining, for each of the plurality of receiver antennas for each respective pair of azimuth angle and elevation angle of the radar signal echoes, expected radar return signal parameters of a signal model fitting the known coordinates of the antenna positions associated with each of the one or more transmitter antennas and the plurality of receiver antennas; and determining, for each of the plurality of receiver antennas for each respective pair of azimuth angle and elevation angle of the radar signal echoes, actual radar return signal parameters of a signal model fitting the radar signal returns obtained using the antenna array; and determining, for each of the plurality of receiver antennas, values indicating magnitude of non-uniform responses to received radar signals with respect to a range of impinging angles.

10. The system of claim 9, wherein:

the determined expected radar return signal parameters comprise expected radar return signal amplitudes and phases for each receiver antenna with respect to each pair of azimuth angle and elevation angle; and the actual radar return signal parameters comprise actual radar return signal amplitudes and phases for each receiver antenna with respect to each pair of azimuth angle and elevation angle.

11. A non-transitory computer readable medium comprising instructions that, when executed by one or more processors, cause the one or more processors to calibrate a radar system by:

obtaining first radar return data from a multiple-input and multiple-output (MIMO) antenna array, wherein:

the first radar return data comprises one or more samples of a radio wave signal impinging on a MIMO receiver array of the MIMO antenna array, wherein each of the one or more samples of the radio wave signal comprises one or more sub-samples of a radio wave signal impinging on respective receiver antennas of a plurality of receiver antennas of the MIMO receiver array; and the radio wave signal impinging on the MIMO receiver array comprises a combination of radar signal echoes of one or more radar signals reflected by one or more calibration reflectors, wherein each of the radar signal echoes impinge on the MIMO receiver array at a pair comprising a respective azimuth angle and a respective elevation angle; and each of the one or more radar signals is generated by a MIMO transmitter array of the MIMO antenna array, wherein each of the one or more radar signals comprises one or more mutually orthogonal radar sub-signals generated by one or more transmitter antennas of the MIMO transmitter array;

processing the first radar return data to determine, for each respective pair of azimuth angle and elevation angle of the radar signal echoes, a calibration vector, wherein the calibration vector comprises a calibration factor for each of the plurality of receiver antennas; and processing received radar signals according to the determined calibration vectors by:

generating a frequency steering matrix for the MIMO antenna array, wherein the frequency steering matrix comprises, for each of a plurality of pairs of azimuth angles and elevation angles within a range of pairs of azimuth angles and elevation angles, a product of a frequency steering vector associated with the respective pair of azimuth angle and elevation angle and the calibration vector associated with the respective pair of azimuth angle and elevation angle;

generating a current covariance matrix of the first radar return data that is initialized to an identity matrix; and iteratively calculating, until a stopping condition is met, a current power spectrum vector of the first radar return data by:

calculating a new power spectrum vector using the frequency steering matrix and the current covariance matrix;

calculating a new covariance matrix using the frequency steering matrix and the new power spectrum vector; and updating the current power spectrum vector to the new power spectrum vector and updating the current covariance matrix to the new covariance matrix.

12. The non-transitory computer readable medium of claim 11, wherein:

each of the radar signal echoes impinging on the MIMO receiver array impinge at a respective elevation angle;

each of the one or more radar signals generated by the MIMO transmitter array comprises a plurality of mutually orthogonal radar sub-signals generated by a plurality of transmitter antennas of the MIMO transmitter array;

processing the first radar return data to determine the calibration vectors further comprises processing the first radar return data to determine, for each respective pair of azimuth angle and elevation angle of the radar signal echoes, a calibration vector, wherein the calibration vector comprises a calibration factor for each pair one of the of the plurality of receiver antennas and one of the plurality of transmitter antennas; and processing received radar signals according to the determined calibration vectors further comprises generating the frequency steering matrix for the MIMO antenna array, wherein the frequency steering matrix comprises, for each pair of one of the plurality of azimuth angles within the range of azimuth angles and one of a plurality of elevation angles within a range of elevation angles, a product of the frequency steering vector associated with the respective pair of azimuth angle and elevation angle and the calibration vector associated with the respective pair of azimuth angle and elevation angle.

13. The non-transitory computer readable medium of claim 11, wherein the MIMO antenna array is a sparse MIMO antenna array.

14. The non-transitory computer readable medium of claim 11, wherein processing the first radar return data to determine, for each respective pair of azimuth angle and elevation angle of the radar signal echoes, respective calibration vectors comprises:

determining, for each of the plurality of receiver antennas for each respective pair of azimuth angle and elevation angle of the radar signal echoes, expected radar return signal parameters of a signal model fitting the known coordinates of the antenna positions associated with each of the one or more transmitter antennas and the plurality of receiver antennas; and determining, for each of the plurality of receiver antennas for each respective pair of azimuth angle and elevation angle of the radar signal echoes, actual radar return signal parameters of a signal model fitting the radar signal returns obtained using the antenna array; and determining, for each of the plurality of receiver antennas, values indicating magnitude of non-uniform responses to received radar signals with respect to a range of impinging angles.

15. The non-transitory computer readable medium of claim 14, wherein:
- the determined expected radar return signal parameters comprise expected radar return signal amplitudes and phases for each receiver antenna with respect to each pair of azimuth angle and elevation angle; and
- the actual radar return signal parameters comprise actual radar return signal amplitudes and phases for each receiver antenna with respect to each pair of azimuth angle and elevation angle.

\* \* \* \* \*